Patented May 13, 1952

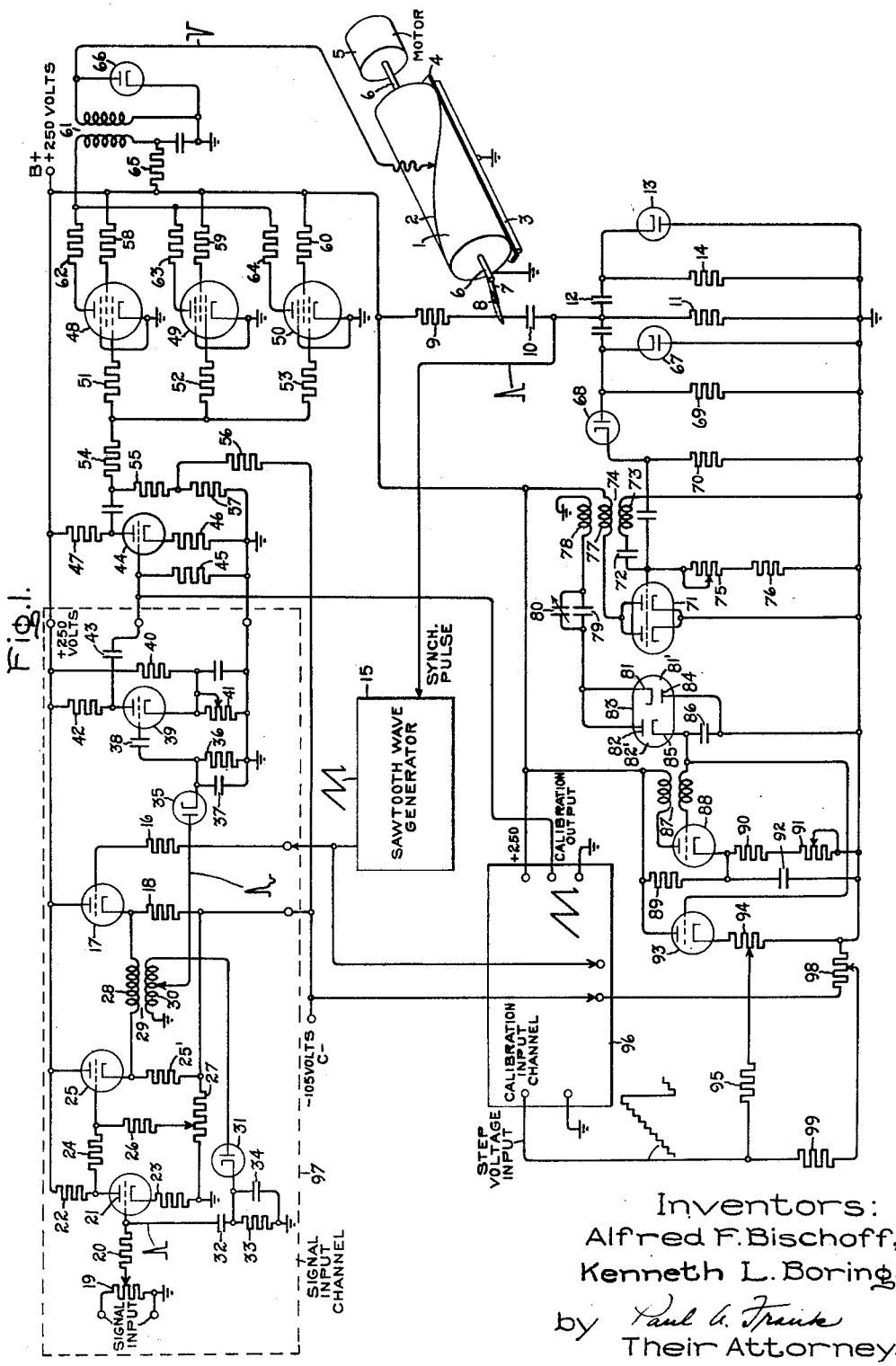

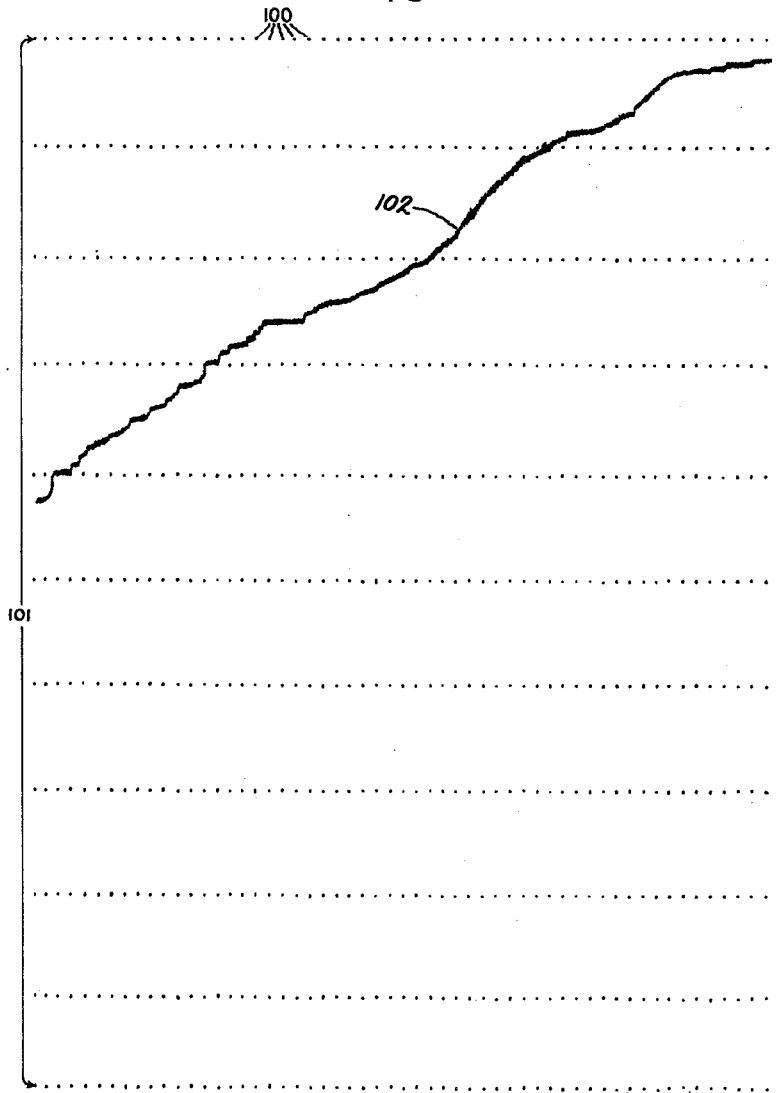

2,596,118

UNITED STATES PATENT OFFICE 2,596,118

RECORDING DEVICE

Alfred F. Bischoff, Balston Spa, and Kenneth L. Boring, Schenectady, N. Y., assignors to General Electric Company, a corporation of New York Application August 20, 1949, Serial No. 111,538

9 Claims. (Cl. 346—33)

Our invention relates to recording devices and more particularly to recording devices employing an electrical current pulse or "spark" as the recording medium.

Such "spark recorders" commonly employ facsimile technique. A sheet of electro-sensitive material is fed between a printing bar and a rotating drum upon which a helical conductor is wound. During each rotation of the drum, a dot is printed upon the interposed material by the passage of a current pulse or spark from the helix to the printing bar. The position of this dot is, of course, dependent upon the angular position of the drum at the moment that the spark is produced. A spark recorder of this general type is described and claimed in copending application Serial No. 137,238 filed January 6, 1950 by Richard F. Shea and assigned to the present assignee. Our present invention constitutes an improvement in such recorders.

When a recorder of this type is employed to record a voltage function, the voltage to be recorded must first be converted into a series of voltage pulses whose time intervals represent the amplitude of this input voltage. The input voltage is "sampled" each time that the drum rotates and a voltage pulse is applied to effect a flow of current between the helical conductor and the printing bar at an interval of time after the beginning of each revolution thereof which corresponds to the instantaneous amplitude of the sampled voltage. The accuracy of such recorders is therefore dependent to a large extent upon the speed and accuracy with which such voltage-to-time conversion can be accomplished.

A principal object of our invention, therefore, is to provide an improved highly accurate recorder of the electrical current impulse type; and in fulfillment of this latter object it is a more specific object of our invention to provide an extremely accurate voltage-to-time conversion circuit suitable for the above described recording apparatus.

It will be appreciated that the recorded trace obtained by such "spark" recorders indicates only the relative amplitude of an input voltage and that some calibrating means must be provided if the trace is to be made to indicate the actual value of the recorded voltage. Such voltage calibration has commonly been accomplished by applying a known input voltage and by matching the recorded trace to calibration lines previously printed upon the electro-sensitive recording paper before a recording run is made. It is evident that no provision can be made in such voltage calibration for non-linearities in the voltage-to-time conversion; and that any change in the circuit parameters due, for example, to temperature variations, voltage fluctuations, or decrease in vacuum tube efficiency as well as any shrinkage of the electro-sensitive recorder material will decrease the accuracy of such calibration.

Accordingly, it is another object of our invention to provide a recorder which automatically prints its own calibration lines by applying determinable voltages through the same general circuits as the measured voltage function during the recording period. As a result, circuit non-linearities and fluctuations as well as recorder material shrinkage are automatically compensated by equivalent changes in the position of the calibration lines.

In general, our improved recorder comprises a rotating drum which is arranged to produce a synchronizing pulse during each revolution immediately prior to the time that a helix, which is wound upon the drum, begins to traverse an adjacent electro-sensitive recorder material or paper. This synchronizing pulse initiates the operation of both a saw-tooth voltage generating circuit and a step voltage generating circuit. A voltage-to-time conversion circuit is provided wherein the input signal to be recorded is continuously compared against the generated saw-tooth voltage and a relatively high voltage pulse is promptly produced whenever their amplitudes equal. This high voltage pulse is employed to effect a flow of current from the rotating helix through the electro-sensitive paper. It will be appreciated that the greater the amplitude of the input voltage, the longer will be the period of time before the saw-tooth voltage attains an equal amplitude, and consequently the further the recording helix will have progressed before this current pulse or spark is produced.

In order to obtain the voltage calibration lines, the generated step voltage is also compared against the saw-tooth voltage in the same manner as an input signal voltage and a high voltage pulse is produced whenever the voltages are equal. The step voltage increases by equivalent increments upon each revolution of the recording drum and a series of dots which represent these voltage steps are therefore printed upon the recording paper.

The novel features which we believe to be characteristic of our invention are set forth with particularity in the appended claims. The invention itself, however, together with further objects and advantages thereof, can best be understood by reference to the following description taken in connection with the accompanying drawing in which Fig. 1 is a simplified schematic diagram of our improved recorder and Fig. 2 is a typical record obtained by the recorder of Fig. 1.

Referring to Fig. 1, we have shown one embodiment of our invention as comprising a recording drum or cylinder 1 upon which a one-turn helical conductor or helix 2 is wound. A printing bar 3 is located adjacent and parallel to the axis of drum 1 and a sheet of electro-sensitive recorder material 4 is fed intermediate the drum 1 and the printing bar 3. A motor 5 rotates the drum 1 by means of a drive shaft 6 at a predetermined speed; and a contact arm 7, which may be carried by drive shaft 6, is arranged to make contact with an external contact arm 8 during each revolution of the drum immediately prior to the point at which the helix 2 begins to traverse the recording paper 4. Both the printing bar 3 and the shaft 6 are preferably grounded as indicated.

In order to produce a synchronizing voltage pulse at the beginning of each revolution of the helical conductor 2, the external contact arm 8 is connected through a resistance 9 to a source of positive potential, conventionally designated as B+, and to a differentiating circuit comprising capacitor 10 and resistor 11 connected in series from the external arm 8 to ground. A negative pulse clipping circuit comprising a capacitor 12 connected in series with a rectifying means such as a diode 13 and a diode load resistance 14 is connected across the resistance 11, and the resultant positive-going voltage pulses appearing at the ungrounded end of resistor 11 are directly connected to a conventional saw-tooth voltage generator designated by block 15.

The output of the saw-tooth generator 15 is connected through a stage isolating resistance 16 to the controlling electrode of an electron discharge device 17 of a conventional cathode follower stage. An anode of the discharge device 17 is directly connected to B+ while a cathode is connected through an impedance element such as a cathode resistance 18 to a source of negative potential conventionally designated as C—.

The input signal to be recorded is applied across a potentiometer 19 one end of which may be grounded as indicated. The movable arm of the potentiometer 19 is connected through a grid current limiting resistance 20 to the control electrode or grid of a triode type electron discharge device 21 of a direct current amplifier stage. The anode of device 21 is connected through a load resistance 22 to B+ while the cathode is connected through a biasing load resistance 23 to ground. The amplified output voltage of the stage is taken from the anode and supplied through a grid bias network resistance 24 to the control electrode or grid of an electron discharge device 25 connected in a cathode follower stage similar to device 17. A proper biasing voltage for the discharge device 25 may be obtained by virtue of a connection from the grid of device 25 to a grid biasing network comprising resistances 22 and 24 connected in series with a direct current return resistance 26 to the movable arm of potentiometer 27 which, in turn, is connected from C— to ground as illustrated.

The primary winding 28 of a pulse transformer 29 preferably of the type which quickly reaches saturation upon the application of a very small current is connected between the cathode of a vacuum tube 25 and the cathode of vacuum tube 17. One end of the secondary winding 30 of transformer 29 is grounded while the other end is connected to a rectifying means such as a diode 31. This pulse transformer 29, in conjunction with the associated cathode follower stages, functions, as will be more fully explained hereinafter, to produce a voltage pulse whenever the amplified input voltage applied to the grid of the discharge device 25 is equal to the instantaneous saw-tooth voltage applied to the grid of discharge device 17.

In order to accelerate the response to this pulse forming circuit and thereby to produce an extremely accurate voltage-to-time conversion, we include a feedback circuit from the pulse transformer to the input of the direct current amplifier. This feedback circuit comprises a rectifying means such as the diode 31 whose anode is directly connected to the ungrounded end of the transformer secondary winding 30 and whose cathode is connected through a coupling capacitor 32 to the grid of amplifying discharge device 21. A load resistance 33 and a by-pass capacitor 34 are connected in parallel from the cathode of diode 31 to ground and together with the diode 31 function as a fast integrating circuit to prevent an oscillatory feedback at the natural resonant frequency of the transformer 29. This feedback circuit, therefore, causes a single very sharp positive-going voltage pulse to be supplied the grid of the amplifying device 21 upon the occurrence of an output pulse from the transformer 29.

The output of the voltage-to-time conversion circuit is taken from a tap on the secondary winding of the pulse transformer 29 and supplied through a voltage clipping rectifier stage such as diode 35, diode load resistance 36, by-pass capacitor 37 and coupling capacitor 38 to the grid of an electron discharge device 39, connected as a conventional high level voltage amplifier biased to amplify only the peaks of the input pulsed signals. The proper biasing voltage for the device 39 may be obtained by a connection from the cathode of the device 39 to a voltage dividing network comprising resistances 40 and 41 connected in series from B+ to ground. The amplified output voltage from this stage developed across an anode load resistance 42 is supplied through a coupling capacitor 43 to a further stage of voltage amplification comprising an electron discharge device 44, a grid return resistance 45, a cathode resistance 46 and an anode connected load resistance 47. The output of this latter amplification stage is connected to a power amplification network comprising three amplification stages corresponding to pentode type electron discharge devices 48, 49 and 50 connected in parallel. The proper biasing voltage for this power amplification network is obtained by a connection from the control electrode or grid of each stage through separate stage decoupling resistances 51, 52 and 53, common grid current limiting resistance 54 and a grid resistance 55 to a voltage dividing network comprising resistances 56 and 57 connected from C— to ground. The proper screen grid voltage is obtained by connections through separate voltage dropping resistances 58, 59 and 60 to B+. The output voltage of this power amplification network is developed across a transformer 61 whose primary winding has one end connected through stage decoupling resistances 62, 63 and 64 to the anodes of each stage respectively and has the other end connected through an isolating resistance 65 to B+.

One end of the secondary winding of output transformer 61 is grounded while the other end is connected to helix 2 on the recording drum 1.

A rectifying means such as diode 66 with its anode connected to the ungrounded end of the transformer secondary winding and its cathode connected to ground functions to damp out any positive voltage overswing and to permit only a negative-going voltage pulse to be applied to the helix.

The synchronizing pulse voltage developed across resistor 11 is also supplied through a double rectifying and gating network comprising diodes 67 and 68 and diode load resistances 69 and 70 to the input of a step voltage generator. The diode 67 is arranged to by-pass negative-going signals to ground while the diode 68 is arranged to transmit only positive-going signals to the step voltage generator with the result that a pure positive-going voltage pulse is applied to the grid of a duo-triode type electron discharge device 71 connected in a conventional blocking oscillator circuit. The control electrodes or grids of the device 71 are connected through a coupling capacitor 72 and through the primary winding 73 of a pulse transformer 74 to ground; and are also connected through a rheostat 75 and a resistance 76 to ground. The cathodes of the device 71 are directly connected to ground while the anodes of the device 71 are connected through a secondary winding 77 to B+. This blocking oscillator network functions to produce a voltage pulse of constant amplitude each time a synchronizing pulse signal is applied.

The output of this blocking oscillator is taken from a tertiary winding 78 of the transformer 74 which has one end grounded and which has its other end coupled through small parallel capacitors 79 and 80 to a cathode 81 and an anode 82 respectively of the two sections 81' and 82' of a duo-diode type of electron discharge device 83. The remaining anode 84 of the device 83 is connected directly to ground while the remaining cathode 85 of the device 83 is connected through a capacitor 86 to ground. Each time a pulse is supplied to the duo-diode discharge device 83 from the blocking oscillator, the voltage across the capacitor 86 increases by an equivalent increment, as will be more fully explained hereinafter. This step voltage developed across capacitor 86 is coupled through the primary winding of a transformer 87 to the control electrode or grid of an electron discharge device 88 which is connected in a network constructed to discharge the capacitor 86 rapidly when a predetermined threshold voltage is reached. The anode of this discharge device 88 is connected through the secondary winding of the transformer 87 to B+ while the cathode of the device 88 is connected to a biasing voltage divider network comprising resistances 89, 90 and 91 connected in series from B+ to ground. A cathode by-pass capacitance 92 is also included in order to maintain a constant bias.

The step voltage developed across capacitor 86 is also directly connected to a cathode follower stage associated with a triode type electron discharge device 93. The output of this latter cathode follower stage is taken from the movable arm of a potentiometer 94 which is connected from the cathode of the device 93 to ground, and is supplied through a resistance 95 to a calibrating input channel shown as block 96 which, preferably, is identical to the signal input channel enclosed by dashed lines 97. A biasing network comprising a potentiometer 98 connected from C— to ground and a resistance 99 connected from the movable tap of potentiometer 98 to the input of calibration channel 96 is preferably also included. The output of the calibration channel 96 is directly connected to the control electrode or grid of the alternating current amplifying discharge device 44, as indicated.

In the operation of the above described recorder, the drum 1 is revolved at a pre-determined speed and the capacitor 10 is discharged by direct connection to ground each time the contact arm 7 engages the contact arm 8. Due to the peaking and pulse clipping action of capacitor 12, resistor 14 and diode 13, a sharp positive-going voltage pulse appears across resistor 11 and is directly coupled to the saw-tooth wave generator. This voltage pulse is employed, in a manner well known to the art, to initiate and thereby to synchronize a saw-tooth voltage wave to the rotation of the helix. The amplitude of an input signal voltage applied across potentiometer 19 and amplified by the direct current amplifier stage associated with the discharge device 21 is continually compared against the output of this saw-tooth voltage generator in what may be termed a "coincidence network" comprising the two cathode follower stages corresponding to the discharge devices 25 and 17 and the pulse transformer 29. The output of the saw-tooth generator is applied to the grid of the discharge device 17 while the input signal is applied to the grid of the discharge device 25. The voltage at one end of the primary winding 28 of the transformer 29 is developed across a cathode resistance 18 and therefore represents the saw-tooth generator output voltage while the voltage at the opposite end of the transformer primary winding 28 is developed across a cathode resistance 25' associated with the discharge device 25 and represents the amplified input voltage.

The operation of this coincidence network may be easily understood by considering the primary winding of the transformer 29 as being connected across a conventional bridge circuit in which the discharge devices 25 and 17 and the resistances 25' and 18 form the balancing arms of the bridge. It is then apparent that current will flow in one particular direction through the transformer primary winding 28 when the instantaneous saw-tooth voltage applied to the grid of the device 17 is less than the amplified input signal voltage applied to the grid of device 25; and conversely that the current through the transformer primary winding 28 will flow in an opposite direction when the instantaneous saw-tooth voltage is greater than this input signal. The current flowing through the transformer primary 28 therefore changes direction when the input voltage is equal to the instantaneous value of the saw-tooth voltage. Since the transformer 29 is constructed to reach saturation rapidly with a very small amount of current flow, there is a sudden decay of magnetic flux in one direction and a rapid expansion of flux in an opposite direction as the instantaneous value of the saw-tooth voltage approaches and passes beyond the magnitude of the input signal voltage. A voltage pulse is thereby induced in the secondary winding 30 of transformer 29 whenever these compared voltages are equal.

In order to accelerate this collapse and expansion of the transformer field, the resultant voltage pulse is made unidirectional by the rectifying and integrating circuit comprising diode 31, diode load resistance 33 and capacitor 34 and coupled back to the direct current amplifying device 21. The direction of this voltage feedback is constructed to be regenerative in character. In the instant embodiment herein described, this feedback pulse is positive-going on the grid of the discharge device 21 and negative-going on the grid and cathode of the discharge device 25. Since the saw-tooth voltage at the cathode of the device 17 is increasing upon the occurrence of a voltage pulse, the voltages on opposite sides of the transformer primary 28 are changing in phase opposition and the rate of voltage crossover is greatly accelerated. The resultant increased differential of current with respect to time through the transformer primary winding 28 causes a larger and steeper output voltage from the transformer 29 and therefore greatly improves the accuracy of voltage-to-time conversion of the circuit.

The regenerated voltage pulse output of this coincidence network is taken from the tap on the transformer secondary winding, amplified by the voltage amplifier stages associated with the discharge devices 39 and 44, and further amplified by the power amplifier network comprising the three parallel amplification stages of discharge devices 48, 49 and 50. This highly amplified current pulse is coupled through the output transformer 61 to the helix 2 and causes a surge of electrical current, commonly called a spark, to pass from the helix through the electro-sensitive paper 4 to the grounded printing bar 3. Since the saw-tooth wave is synchronized to the movement of the helix 2, a current surge or spark will therefore be produced during each revolution of the cylinder 1, and the position of the resultant dot on the recording paper will be determined by the interval of time which has elapsed from the beginning of each revolution to the production of this high voltage pulse.

In order to produce the calibration marks on the recording paper, the synchronizing voltage pulse produced by the engagement of contact arms 7 and 8 and developed across resistor 11 is coupled as a positive-going pulse through diode 68 to the grid of the discharge device 71 connected in a conventional blocking oscillator circuit whose natural period of blocking is determined by the time constant of the resistance-capacitance network comprising capacitor 72 and resistors 75 and 76. This blocking oscillator fires each time a synchronizing pulse is received and functions in a well-known manner to generate a large voltage pulse of constant amplitude at the beginning of each rotation of the recording drum 1. The output of the blocking oscillator network is taken from the tertiary winding of transformer 74 and coupled through capacitors 79 and 80 to diodes 81' and 82'. When the voltage across the transformer tertiary winding is positive with respect to ground, diode 82' conducts and capacitors 79 and 80 are effectively in series with capacitor 86 so that this capacitive network functions as a voltage divider to impress a fraction of this positive voltage across capacitor 86. When the transformer output voltage becomes negative, this negative overswing is conducted to ground by diode 81' and a very small positive voltage remains on capacitor 86. Each time the output from transformer 74 goes positive, a substantially equal incremental voltage is added to the capacitor 86 until the bias of discharge device 88 is overcome and discharge device 88, acting in a blocking oscillator fashion, reduces the potential on capacitor 86 substantially to ground. By adjusting the value of capacitor 89, the amplitude of each increment of voltage can be varied and, by adjusting the value of resistance 91, the cathode bias of discharge device 88 and consequently the number of voltage steps required to cause the conduction of device 88 can be controlled.

This step voltage developed across capacitor 86 is applied through the cathode follower stage associated with the discharge device 93 to the calibration input channel 96 whose construction and operation is identical to the signal input channel described above. The voltage pulse output of this calibration input channel 96 is amplified and applied to the recording helix 2 through the same amplification circuits as the signal input channel. Since an increased voltage level is applied to the calibration channel upon each revolution of the recording drum 1, a series of dots 100, which can be seen in the typical record illustrated by Fig. 2, are produced at points on the electro-sensitive paper 4 which correspond to these increasing voltage levels; one dot being printed for each revolution of the drum and the number of dots in each vertical line 101 being determined by the number of steps in the step voltage wave. The amplitude of this step voltage can easily be adjusted by potentiometer 94 so that the dots completely traverse the height of the recording paper or any desired portion thereof.

As indicated by Fig. 1 the same saw-tooth voltage which is supplied to the coincidence network of the signal input channel is also supplied to the coincidence network of the calibration input channel with the result that any non-linearity of the saw-tooth voltage is automatically revealed by a corresponding non-linear displacement of the calibration marks. Furthermore, since a common alternating current amplifier network comprising the amplifier stages associated with the discharge devices 44, 48, 49 and 50 is employed, any variations in the electrical parameters of this network are also automatically compensated by an equal variation in the position of the calibration marks. A typical record 102 produced by a spark recorder such as described above with a step voltage having 11 steps is illustrated in Fig. 2 and is believed to be self-explanatory.

Although we have illustrated our invention as employing only one signal input channel it will be appreciated that many more signal input channels connected to a common amplifier network may be included in order to enable a plurality of voltage functions to be recorded simultaneously. It is also to be understood that although we have shown a particular embodiment of our invention many modifications may be made and we, therefore, intend by the appended claims to cover all such modifications as fall within the true spirit and scope of our invention.

What we claim as new and desire to secure by Letters Patent of the United States is:

1. A voltage-to-time conversion circuit comprising a saw-tooth voltage generating circuit, a first cathode follower stage having an input circuit connected to receive a voltage to be measured, a second cathode follower stage having an input circuit connected to receive a saw-tooth voltage from said saw-tooth voltage generating circuit, each said cathode follower stage having a respective output terminal, a pulse transformer having a primary winding connected between an output terminal of said first cathode follower stage and an output terminal of said second cathode follower stage, said pulse transformer producing a voltage pulse whenever the amplitudes of the voltages at each of said output terminals are mutually equivalent, and voltage inverting means connected from said transformer to the input circuit of said first cathode follower stage to couple back regeneratively a fraction of said voltage pulse to the primary winding of said transformer thereby to accelerate the response of said transformer.

2. A voltage-to-time conversion circuit comprising a pair of substantially identical cathode follower stages, an amplifier stage having input connections for receiving a signal to be measured and having output connections for supplying an amplified signal voltage to the input circuit of one of said cathode follower stages, a saw-tooth voltage generating circuit connected to supply a substantially linear saw-tooth voltage to the input circuit of the other of said cathode follower stages, a pulse transformer having a primary winding connected between a point in the output circuit of one of said cathode follower stages and a corresponding point in the output circuit of the other of said cathode follower stages, said pulse transformer producing a voltage pulse whenever said amplified signal voltage is equal to the instantaneous value of said saw-tooth voltage, and a feedback coupling connection to supply a fraction of said voltage pulse to said input connections of said amplifier stage to quicken the response of said pulse transformer by accelerating the rate of change of current flow through said transformer primary winding upon the occurrence of a voltage pulse.

3. A voltage-to-time conversion circuit comprising a pair of substantially identical cathode follower stages, an amplifier stage having input connections for receiving a signal voltage to be measured and having output connections for supplying an amplified signal voltage to the input circuit of one of said cathode follower stages, a saw-tooth voltage generating circuit connected to supply a substantially linear saw-tooth voltage to the input circuit of the other of said cathode follower stages, a pulse transformer having a primary winding connected between a point in the output circuit of one of said cathode follower stages and a corresponding point in the output circuit of the other of said cathode follower stages, said pulse transformer producing a voltage pulse across a secondary winding thereof whenever the voltages at said corresponding points are mutually equivalent, and voltage pulse rectifying and integrating means connected between said secondary winding of said transformer and said input connections of said amplifier stage to filter spurious transformer oscillations and to feed back regeneratively a fraction of said voltage pulse to said transformer thereby to accelerate the production and increase the amplitude of said voltage pulse.

4. A voltage-to-time conversion circuit comprising a pair of cathode follower stages, each of said stages including an electron discharge device having a cathode, an anode, at least one control electrode, and an impedance element connected in its anode-to-cathode circuit, means connected to the control electrode of one of said electron discharge devices for supplying a signal voltage thereto, a saw-tooth voltage generating circuit connected to supply a saw-tooth voltage to the control electrode of the other of said electron discharge devices, a pulse transformer having a primary winding connected between the cathodes of said discharge devices to produce a voltage pulse across a secondary winding of said transformer whenever the amplitudes of the voltages at said cathodes are mutually equivalent, and voltage inverting means connected between said transformer secondary winding and the control electrode of said signal voltage receiving one of said discharge devices to feed back regeneratively a fraction of said voltage pulse to said transformer thereby to accelerate the production and increase the amplitude of said voltage pulse.

5. In a recorder, voltage-to-time conversion circuit comprising a pair of cathode follower stages, each of said stages including an electron discharge device having a cathode, an anode and at least one control electrode, a voltage amplifying and inverting stage having an input circuit connected to receive a signal voltage and having an output circuit connected tto supply an amplified and inverted signal voltage to the control electrode of one of said discharge devices, a saw-tooth voltage generating circuit connected to supply a saw-tooth voltage to the control electrode of the other of said discharge devices, a pulse transformer having a primary winding connected between the cathodes of said discharge devices to produce a voltage pulse across a secondary winding of said transformer whenever the amplitude of the voltages at said cathodes are mutually equivalent, and voltage pulse rectifying and integrating means connected between said transformer secondary winding and the input circuit of said voltage amplifying and inverting stage to suppress spurious transformer oscillations and to feed back regeneratively a fraction of said voltage pulse to said transformer thereby to accelerate the production and increase the amplitude of said voltage pulse.

6. In a recorder the combination comprising a rotatable helical conductor, a saw-tooth voltage generator, voltage impulse producing means responsive to the rotation of said helical conductor and connected to said saw-tooth voltage generator to initiate a wave of saw-tooth voltage at the beginning of each revolution of said helical conductor, an amplifier stage having input terminals for receiving a voltage to be recorded, a pair of cathode follower stages, one of said cathode follower stages, having an input circuit connected to receive said saw-tooth voltage and the other of said cathode follower stages having an input circuit connected to receive an amplified signal voltage from said amplifier stage, a pulse transformer having a primary winding connected between a point in the output circuit of one of said cathode follower stages and a corresponding point in the output circuit of the other of said cathode follower stages, said pulse transformer instantaneously producing a voltage pulse whenever the voltages at said corresponding points are mutually equivalent, means for rectifying said transformer voltage pulses, and coupling means to supply said rectified voltage pulses to the input terminals of said amplifier stage to introduce a regenerative feedback voltage accelerating the production and increasing the amplitude of said transformer voltage pulses.

7. In a recorder the combination comprising a rotatable helical conductor, an electrically conducting printing bar adjacent said helical conductor, means for feeding an electro-sensitive material intermediate said printing bar and said helical conductor, a pulse generating circuit energized by the rotation of said helical conductor and producing a voltage impulse at the beginning of each revolution thereof with respect to said printing bar, a step voltage generating circuit connected to receive said voltage impulses and producing a step voltage wave having a determinable incremental increase each time an impulse is received, a voltage-to-time conversion circuit connected to receive said step voltage and producing a voltage pulse at a time interval after the beginning of each revolution of said helical conductor which represents the instantaneous amplitude of said step voltage, and pulse amplifying means connected to receive and amplify said last mentioned voltage pulses, said pulse amplifying means having output connections to impress said amplified voltage pulses between said printing bar and said helical conductor to produce a surge of current through said electro-sensitive material in response to said amplified voltage pulses thereby to provide amplitude calibration marks upon said electro-sensitive material.

8. In a spark recorder the combination comprising a rotatable helical conductor, an electrically conducting printing bar adjacent said helical conductor, means for feeding a sheet of electro-sensitive material intermediate said helical conductor and said printing bar, means connected to said helical conductor for producing a synchronizing voltage impulse each time said helical conductor begins to traverse said electro-sensitive material, a step voltage generating circuit connected to receive said synchronizing voltage impulses and producing a step voltage wave having an equal incremental increase each time an impulse is received, a pair of voltage-to-time conversion circuits having independent input terminals, each of said conversion circuits having connections to receive said synchronizing impulses and producing a voltage pulse at a time interval after the occurrence of each synchronizing impulse which represents the instantaneous amplitude of a voltage supplied to its input terminals, means for supplying said step voltage wave to the input terminals of one of said conversion circuits, means for supplying a signal voltage to be recorded to the input terminals of the other of said conversion circuits, and a common pulse amplifying circuit connected to receive the voltage pulses produced by both of said conversion circuits and having an output connection between said helical conductor and said printing bar to effect current pulses through said electro-sensitive material responsive to said voltage pulses produced by both of said conversion circuits, thereby to print calibration marks and a record of said signal voltage simultaneously upon said electro-sensitive material.

9. In a recorder, the combination comprising, a rotatable helical conductor, means for producing a synchronizing signal at the beginning of each revolution of said conductor, saw tooth voltage generating means connected to receive said synchronizing signal for producing a saw tooth voltage wave initiated in response to said synchronizing signal, step voltage generating means energized by said synchronizing signal for producing a step voltage wave having a predetermined voltage change in response to successive synchronizing signals, a first coincidence network connected to receive said saw tooth voltage wave and a signal voltage to be recorded and to supply voltage pulses to said helical conductor whose time of occurrence relative to the time of said synchronizing signal represents the instantaneous amplitude to a received signal voltage, and a second coincidence network connected to receive said saw tooth voltage and said step voltage and to supply calibrating voltage pulses to said helical conductor whose time of occurrence relative to said synchronizing signal is determined by the amplitude of said step voltage change.

ALFRED F. BISCHOFF.
KENNETH L. BORING.

REFERENCES CITED

The following references are of record in the file of this patent:

UNITED STATES PATENTS

| Number | Name | Date |
|---|---|---|
| 2,443,647 | Waterman | June 22, 1948 |
| 2,467,465 | Cawein | Apr. 19, 1949 |
| 2,469,227 | Fraser | May 3, 1949 |
| 2,502,419 | Cannon et al. | Apr. 14, 1950 |